UNITED STATES PATENT OFFICE 2,447,367

REACTION PRODUCT OF ROSIN-POLYHYDRIC ALCOHOL ESTERS AND PROCESS OF MAKING SAME

John B. Rust and William B. Canfield, Montclair, N. J., assignors, by direct and mesne assignments, of one-half to Montclair Research Corporation, a corporation of New Jersey, and one-half to Ellis-Foster Company, a corporation of New Jersey No Drawing. Application October 7, 1944, Serial No. 557,728

12 Claims. (Cl. 260—27)

This invention relates to reaction products of rosin-polyhydric alcohol esters and polymers derived from alpha-unsaturated carboxylic acid compounds.

An object of the invention is to prepare modified rosin esters of improved properties for use in coating compositions. Another object is the preparation of drying oil varnishes which are fast drying even when drying oils of the soft-drying type are used. A further object is to prepare light-colored resins soluble in organic solvents and compatible with cellulose esters and ethers. Still other objects will be apparent from the description which follows.

It has been found that, when a polymerized alpha-unsaturated carboxylic acid compound such as polymerized butyl methacrylate is heated with a rosin-polyhydric alcohol ester containing at least one free hydroxyl group such as glyceryl diabietate, a reaction occurs with the elimination of butyl alcohol and the formation of a homogeneous mixed ester between glyceryl diabietate and the polymer of butyl methacrylate. This resin, as well as others of which this is a type, is soluble in various solvents including ketones, aromatic hydrocarbons, esters, butyl alcohol and alcohols higher than butyl, halogenated hydrocarbons and nitroparaffins. It is also soluble in drying oils and serves for the preparation of varnishes. Such varnishes differ from those made from ordinary rosin ester (glyceryl triabietate) in being faster drying and more water-resistant. Fast-drying varnishes are obtained even when the oils of slower drying type (linseed) are used. The resin is also compatible with nitrocellulose and forms nitrocellulose lacquers which show faster solvent-release than ordinary rosin ester.

Rosin-polyhydric alcohol esters containing free hydroxyl groups comprise those made from rosin and an excess of glycerol, glycols, polyglycols, polyglycerol, pentaerythritol, dipentaerythritol, sorbitol, trihydroxymethylaminomethane, and the like. Besides rosin, other esterifiable acidic natural resins such as congo and damar can be used.

Polymerized alpha-unsaturated carboxylic acid compounds which are used to modify the rosin ester include the polymerized esters and free acids and anhydrides of acrylic, methacrylic, crotonic, maleic, fumaric, itaconic, citraconic, glutaconic, methylenemalonic, etc., acids. The esters are those of monohydric alcohols which volatilize readily at temperatures generally used to make rosin esters and in general are no higher than octyl unless reduced pressure is used. The polymerized esters may be converted to the polymerized acids prior to reaction with the rosin ester, in which case the reaction with the rosin ester proceeds with elimination of water as in other esterifications. When ester polymers are used the alcohol corresponding to the ester is evolved. Polymeric acrylic and methacrylic acids may be obtained by direct polymerization of the acids. In general the polymers are made from compounds containing the group HC=C—COOR, where R is hydrogen or alkyl. More specifically the polymers utilized herein may be represented by saturated chain compounds containing groups of the general formula

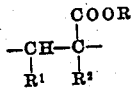

where R is hydrogen or alkyl (preferably of 8 carbon atoms or less) and $R^1$ and $R^2$ are H, $CH_3$, COOH, COOR, $CH_2COOH$ or $CH_2COOR$.

The polymers, therefore, are those containing carboxyl or carbalkoxy groups. Other polymers which belong to this general class are copolymers of such alpha-unsaturated acid compounds with polymerizable compounds of other types containing a single group $CH_2=CR—(CH_2)_x—$, where R is hydrogen or methyl and $x$ is 0 or 1, such as styrene, vinyl acetate, vinyl chloride, coumarone, indene, allyl and methallyl esters, and the like. A particular type consists of the reaction product of maleic anhydride and the like with vinyl compounds such as styrene and vinyl acetate. Polymers containing groups derived from acids such as crotonic and maleic, are more likely to be copolymers of these compounds with the polymerizable bodies above named.

The process of this invention consists in heating the rosin-polyhydric alcohol ester with the polymer containing carboxyl or carbalkoxy groups at between about 200° and 300° C. until the reaction product is homogeneous when tested cold and the acid number is low. An advantage of using polymeric esters is that low acid number is readily obtained and the main factor is to heat until the reaction product is homogeneous. Some products go over to an infusible stage on heating, this being the case particularly when the rosin-polyhydric alcohol ester contains more than one free hydroxyl group. Heating may be done in an inert atmosphere, although this is usually optional since the products have good color stability. A modification of the process which can be used in some cases consists in heating the rosin, polyhydric alcohol and polymer together in one step.

Alcoholysis catalysts can be used if desired in reacting the rosin ester and the polymerized alpha-unsaturated acid ester.

The resins may be modified in various ways. For example, the rosin-polyhydric alcohol ester containing at least one free hydroxyl group may be modified by phenol-aldehyde condensation products. Furthermore, this rosin ester may be modified by reaction with maleic anhydride in such a way that it still contains free hydroxyl groups, the inclusion of maleic anhydride being carried out either by pretreating the rosin with maleic, adding maleic during the reaction of the rosin with the polyhydric alcohol, or heating the hydroxyl-containing ester with maleic afterwards. Part of the rosin may be replaced by other acids such as phthalic, succinic, sebacic, benzoic and the like, or by fatty acids such as drying oil acids. Also the final rosin-polyhydric alcohol-alpha-unsaturated carboxylic acid compound polymer resin may be fluxed or mixed in solution with phenol-aldehyde resins, alkyd resins and polymeric resins such as those from coumarone and indene.

Coating compositions comprise the major field of use for the resins of this invention, their application being either in drying oil varnishes or in lacquers. An analogous field is in printing inks. Those resins which harden on heating may be used as baked finishes and also find application in casting and molding compositions where they are hardened by heat.

The following examples are merely illustrative and are not to be construed as limiting. Parts are by weight.

*Example 1.—Reaction product of glyceryl diabietate and a butyl methacrylate polymer*

189 parts of glyceryl diabietate and 35.5 parts of n-butyl methacrylate polymer were placed in a three-necked flask equipped with a stirrer, thermometer and delivery tube leading into a condenser. The glyceryl diabietate and polybutyl methacrylate were heated to 200° C. There was much foaming, and at 200°–230° C. a distillate was observed to come over. Heating was continued at 240°–250° C. for 5 hours to give a clear, pale-colored, brittle resin, soluble in linseed oil. The resin possessed an acid number of 11 and a softening point (ring and ball) of 90° C. During heating there was collected 16.2 grams of a distillate possessing a butyl alcohol odor and which boiled at 110°–124° C.

30 parts of the resin and 60 parts of alkali-refined linseed oil were heated together slowly to 290° C. in 1 hour and held at 290°–300° C. for 40 minutes to give a clear base which could be drawn into a string 24" to 30" in length. The varnish base was cooled to 200° C. and thinned with 90 parts of mineral spirits to which was added 0.5% lead and 0.05% cobalt (as naphthenates) based on the oil. The resulting varnish was clear and light colored. It air-dried to a dust-free film in 1¼ hours and tack-free in 4¾ hours. The film after drying for 48 hours possessed a Sward Rocker hardness of 35 and softened in tap water after 24 hours of immersion and started to cloud in 72 hours. A similar varnish made from ester gum softened in 12 hours and clouded in 24 hours.

*Example 2.—Reaction product of glyceryl monoabietate and polybutyl methacrylate*

106 parts of glyceryl monoabietate and 35.5 parts of polybutyl methacrylate were heated together in a 600 ml. beaker carefully to 250° C. Heating was continued slowly as the light colored, clear resin foamed considerably and was very viscous. Heating was continued at 240°–250° C. for 5 hours. The resin possessed an acid number of 13 and a softening point of 37° C. If heating is continued the resin becomes infusible.

A 25-gallon linseed oil varnish made from the fusible resin dried to a dust-free film in 1¼ hours and tack-free in 4¾ hours. The film after air-drying for 48 hours possessed a Sward Rocker hardness of 23.

*Example 3.—Reaction product of pentaerythrityl triabietate and polybutyl methacrylate*

200 parts of pentaerythrityl triabietate and 25.1 parts of polybutyl methacrylate were heated together in a 600 ml. beaker to 240°–250° C. A clear resin was secured. Heating was continued at this temperature for 4½ hours to give a light colored, clear, brittle resin. The resin possessed an acid number of 16.2 and a softening point of 101° C.

A 25-gallon linseed oil varnish resin was clear and light colored. It air-dried to a dust-free film in 1¼ hours and tack-free in 5 hours. The film after air-drying for 48 hours possessed a Sward Rocker hardness of 35 and softened in tap water after 24 hours of immersion.

*Example 4.—Reaction product of pentaerythrityl diabietate and polybutyl methacrylate*

170.4 parts of pentaerythrityl diabietate and 28.4 parts of polybutyl methacrylate were heated together in a 600 ml. beaker carefully to 250° C. The resin was clear and foamed somewhat. Heating was continued at 240°–250° C. for 2¼ hours. During this period of heating the resin foamed, became increasingly more viscous, and then became infusible. This example illustrates the preparation of heat-curing resins by use of a rosin-polyhydric alcohol ester containing more than one free hydroxyl group.

*Example 5.—Reaction product of diethylene glycol monoabietate and polybutyl methacrylate*

146.0 parts of diethylene glycol monoabietate and 47.3 parts of polybutyl methacrylate were heated together in a 600 ml. beaker for 6 hours at 240°–250° C. to give a light colored, hard, brittle resin which possessed an acid number of 19 and a softening point of 87° C. The resin was soluble in drying oils.

*Example 6.—Reaction product of glyceryl diabietate and a copolymer of methyl methacrylate and allyl acetate*

100 parts of allyl acetate and 50 parts of methyl methacrylate were refluxed together at boiling for 8 hours in the presence of 3 parts of benzoyl peroxide. The resulting syrup was further heated at 140°–150° C. to give a hard, brittle copolymer.

189 parts of glyceryl diabietate and 30.5 parts of the above copolymer were heated together as follows:

| | Hours |
|---|---|
| 20°–200° C | 1 |
| 200°–250° C | ½ |
| 245°–260° C | 5½ |

A fairly light colored, clear, soluble resin was obtained which possessed an acid number of 10 and a softening point of 103° C.

*Example 7.—Reaction product of glyceryl diabietate and a copolymer of butyl methacrylate and vinyl acetate*

50 parts of vinyl acetate, 50 parts of butyl methacrylate and 0.5 part of benzoyl peroxide were warmed together to 80°–90° C. under reflux, whereupon the reaction mixture immediately thickened. 100 parts of dioxan (solvent) were added and heating was continued for 2 hours at a gentle reflux temperature. After removal of the solvent, the resulting copolymer was hard and brittle.

151.2 parts of glyceryl diabietate and 56.8 parts of the above copolymer were heated together as follows:

| | Hours |
|---|---|
| 20°–200° C | 1 |
| 200°–240° C | 1 |
| 240°–250° C | 4 |

An extremely light colored, pale resin was secured which was hard and brittle. The resin possessed an acid number of 15.8 and a softening point of 101° C.

A 25-gallon varnish made from alkali-refined linseed oil was clear and light colored. The varnish air-dried to a dust-free film in 1 hour and was tack-free after 4½ hours. A film of this varnish after air-drying for 48 hours possessed a Sward Rocker hardness of 41 and softened in tap water after immersion for 24 hours.

*Example 8.—Reaction product of glyceryl diabietate and a copolymer of butyl methacrylate and allyl acetate*

100 parts of allyl acetate and 50 parts of n-butyl methacrylate and 1.5 parts of benzoyl peroxide were heated together under reflux at 90°–100° C. for 6 hours. When the monomeric constituents had been removed, the resulting copolymer contained 52.5% n-butyl methacrylate and 47.3% of allyl acetate.

100 parts of glyceryl diabietate and 35.7 parts of the above copolymer were heated together to 240° C. and held at 240°–250° C. for 6 hours. A light-colored, clear, oil-soluble resin was obtained which possessed an acid number of 10.0 and a softening point of 103° C.

*Example 9.—Reaction product of glyceryl diabietate and a copolymer of butyl methacrylate and styrene*

50 parts of styrene, 50 parts of butyl methacrylate, 100 parts of dioxan, and 1.0 parts of benzoyl peroxide were heated together in a flask equipped with a water condenser for 4 hours, a thick syrup being obtained. Upon removal of the solvent 94 parts of a hard, brittle copolymer was secured.

100 parts of glyceryl diabietate and 37.6 parts of copolymer were heated together to 240° C. and held at 240°–250° C. for 4 hours to give a pale colored resin having an acid number of 3.9 and a softening point of 108° C.

A 25-gallon linseed oil varnish, to which 0.5% lead and 0.05% cobalt (as naphthenates) drier were added, was clear and light colored. It dried to a dust-free film in 1 hour and was tack-free after 4½ hours. A film of the varnish after drying for 48 hours possessed a Sward Rocker hardness of 41 and softened after 24 hours in tap water.

*Example 10.—Reaction product of glyceryl diabietate and a hydrolyzed copolymer of butyl methacrylate and styrene*

50 parts of the copolymer of Example 9 was dissolved in n-butyl alcohol and refluxed for 12 hours with 10% caustic soda in n-butanol. The reaction mixture was acidified, washed, powdered, and air-dried to give a water-insoluble resinous product possessing an acid number of 180.

100 parts of glyceryl diabietate and 41.2 parts of saponified copolymer were heated at 210–220° C. for 15 minutes. The resin was clear and soluble. After an additional 5 minutes of heating, it set up to an infusible gel.

*Example 11.—Reaction product of glyceryl diabietate and a copolymer of maleic anhydride and styrene*

40 parts of maleic anhydride, 80 parts of styrene, 0.6 part of benzoyl peroxide, and 300 parts of dioxan (solvent) were heated together on a water bath for 3 hours to give a hard, tough, brittle resin after removal of the solvent. The copolymer was soluble in alkali, in dilute aqueous solution, and it possessed an acid number of 222.

150 parts of glyceryl diabietate and 50 parts of the above copolymer were gradually heated together to 240° C. and held at this temperature (1¼ hours) until the resin was clear when cold. Heating was continued at this temperature (240°–250° C.) for 6 hours to give a hard, brittle, fair colored resin which was oil-soluble. The resin possessed an acid number of 7.8 and a softening point of 107° C.

*Example 12.—Reaction product of glyceryl diabietate and a copolymer of diethyl maleate and styrene*

40 parts of diethyl maleate, 40 parts of styrene, and 0.8 part of benzoyl peroxide were heated carefully to 100°–110° C. When thickening was observed, 80 parts of dioxan were added and heating continued until a hard, brittle copolymer was secured after removal of the dioxan.

100 parts of glyceryl diabietate and 50 parts of copolymer were heated together carefully in a 600 ml. beaker, equipped with a thermometer, slowly to 150° C. The resulting resin was extremely clear and light colored. The resin possessed an acid number of 7.3 and a softening point of 98° C.

30 parts of resin and 60 parts of alkali-refined linseed oil were heated together to 300° C. and held at this temperature for 40 minutes. The resulting varnish base was cooled to 200° C. and thinned with 90 parts of Varsol to which were added 0.5% lead and 0.005% cobalt (as naphthenates) drier. The resulting varnish was clear and light colored. It air-dried to a dust-free film in 1 hour and was tack-free after 4½ hours. A film air-dried for 48 hours possessed a Sward Rocker hardness of 35 and softened after 24 hours in tap water.

*Example 13.—Reaction product of glyceryl diabietate and a copolymer of ethyl methacrylate and vinyl acetate*

40 parts of vinyl acetate and 60 parts of ethyl methacrylate and 1.0 g. of benzoyl peroxide were heated in the presence of 100 parts of acetone at 80°–90° C. under reflux for 4 hours. A viscous syrup was secured. The solvent was removed to give a hard, brittle copolymer.

100 parts of glyceryl diabietate and 25.2 parts of the above copolymer were heated together at 240°–250° C. for 4 hours. The resulting resin was clear, light-colored, and oil soluble. It possessed an acid number of 13 and a softening point of 96° C.

30 parts of the above resin and 60 parts of alkali-refined linseed oil were heated together slowly to 300° C. Heating was continued at 290°–300° C. for 45 minutes. The resulting varnish base was cooled to 200° C. and thinned with 90 parts of Varsol to which were added 0.5% lead and 0.05% cobalt (as naphthenates) drier. The resulting varnish was clear and very light colored. The varnish dried to a dust-free film in 1 hour and was tack-free in 4½ hours. A film dried for 48 hours possessed a Sward Rocker hardness of 43 and softened in water after immersion for 24 hours.

*Example 14.—Reaction product of glyceryl diabietate and a copolymer of ethyl acrylate and vinyl acetate*

40 parts of vinyl acetate, 60 parts of ethyl acrylate, and 1 part of benzoyl peroxide were heated in the presence of 100 parts of acetone at 80°–90° C. under reflux for 4 hours. A viscous syrup was secured. The solvent was removed to yield a tough rubbery copolymer.

100 parts of glyceryl diabietate and 22.1 parts of the above copolymer were heated together to 200° C. The resin was hazy. Heating was continued at 240°–250° C. for 4 hours. The resulting resin was hazy and light colored. It possessed an acid number of 15 and a softening point of 91° C.

We claim:

1. A soluble resinous composition comprising the reaction product, at between 200° C. and 300° C., of a rosin-polyhydric alcohol ester containing at least one free hydroxyl group, and a saturated polymer containing hydroxyl-reactive groups selected from the class consisting of carboxyl and carbalkoxy and obtained by polymerization of an alpha-unsaturated acid compound selected from the class consisting of alpha-unsaturated carboxylic acids and esters thereof of monohydric alcohols volatile at said reaction temperature.

2. A soluble resinous composition comprising the reaction product, at between 200° C. and 300° C., of a rosin-polyhydric alcohol ester containing at least one free hydroxyl group and saturated polymer containing hydroxyl-reactive groups selected from the class consisting of carboxyl and carbalkoxy and obtained by copolymerization of an alpha-unsaturated acid compound selected from the class consisting of alpha-unsaturated carboxylic acids and esters thereof of monohydric alcohols volatile at said reaction temperature, and another polymerizable compound containing a single active double bond.

3. A soluble resinous composition comprising the reaction product, at between 200° C. and 300° C., of a rosin-polyhydric alcohol ester containing at least one free hydroxyl group and polymerized butyl methacrylate.

4. A soluble resinous composition comprising the reaction product, at between 200° C. and 300° C., of a rosin-polyhydric alcohol ester containing at least one free hydroxyl group and a copolymer of butyl methacrylate and styrene.

5. A soluble resinous composition comprising the reaction product, at between 200° C. and 300° C., of a rosin-polyhydric alcohol ester containing at least one free hydroxyl group and a copolymer of ethyl methacrylate and vinyl acetate.

6. A soluble resinous composition comprising the reaction product, at between 200° C. and 300° C., of glyceryl diabietate and a saturated polymer containing hydroxyl-reactive groups selected from the class consisting of carboxyl and carbalkoxy and obtained by polymerization of an alpha-unsaturated acid compound selected from the class consisting of alpha-unsaturated carboxylic acids and esters thereof of monohydric alcohols volatile at said reaction temperature.

7. A soluble resinous composition comprising the reaction product, at between 200° C. and 300° C., of pentaerythrityl triabietate and a saturated polymer containing hydroxyl-reactive groups selected from the class consisting of carboxyl and carbalkoxy and obtained by polymerization of an alpha-unsaturated acid compound selected from the class consisting of alpha-unsaturated carboxylic acids and esters thereof of monohydric alcohols volatile at said reaction temperature.

8. A soluble resinous composition comprising the reaction product, at between 200° C. and 300° C., of glyceryl diabietate and polymerized butyl methacrylate.

9. A soluble resinous composition comprising the reaction product, at between 200° C. and 300° C., of glyceryl diabietate and a copolymer of butyl methacrylate and styrene.

10. A soluble resinous composition comprising the reaction product, at between 200° C. and 300° C., of glyceryl diabietate and a copolymer of ethyl methacrylate and vinyl acetate.

11. The process of making a soluble resinous composition which comprises heating at between 200° C. and 300° C. a mixture comprising a rosin-polyhydric alcohol ester containing at least one free hydroxyl group, and a saturated polymer containing hydroxyl-reactive groups selected from the class consisting of carboxyl and carbalkoxy and obtained by polymerization of an alpha-unsaturated acid compound selected from the class consisting of alpha-unsaturated carboxylic acids and esters thereof of monohydric alcohols volatile at said reaction temperature.

12. The process of making a soluble resinous composition which comprises heating at between 200° C. and 300° C. a mixture comprising a rosin-polyhydric alcohol ester containing at least one free hydroxyl group, and a saturated polymer containing hydroxyl-reactive groups selected from the class consisting of carboxyl and carbalkoxy and obtained by copolymerization of an alpha-unsaturated acid compound selected from the class consisting of alpha-unsaturated carboxylic acids and esters thereof of monohydric alcohols volatile at said reaction temperature, and another polymerizable compound containing a single active double bond.

JOHN B. RUST.
WILLIAM B. CANFIELD.

REFERENCES CITED

The following references are of record in the file of this patent:

UNITED STATES PATENTS

| Number | Name | Date |
|---|---|---|
| 1,993,028 | Peterson | Mar. 5, 1935 |
| 2,160,532 | Barrett | May 30, 1939 |
| 2,211,689 | Dittmar | Aug. 13, 1940 |
| 2,371,065 | Powers | Mar. 6, 1945 |

OTHER REFERENCES

Oswald, Official Digest, Jan. 1944, No. 232, pages 7 and 20 to 22.